H. BECKERS.
BABY CARRIAGE AND LIKE VEHICLE.
APPLICATION FILED JULY 3, 1914.

1,149,111.

Patented Aug. 3, 1915.
3 SHEETS—SHEET 1.

Witnesses:
J. H. Crawford
A. G. Hines

Inventor
Hubert Beckers,
By Victor J. Evans
Attorney

H. BECKERS.
BABY CARRIAGE AND LIKE VEHICLE.
APPLICATION FILED JULY 3, 1914.

1,149,111.

Patented Aug. 3, 1915.
3 SHEETS—SHEET 2.

Inventor
Hubert Beckers,

Witnesses
J. H. Crawford.
A. A. Hines.

By Victor J. Evans
Attorney

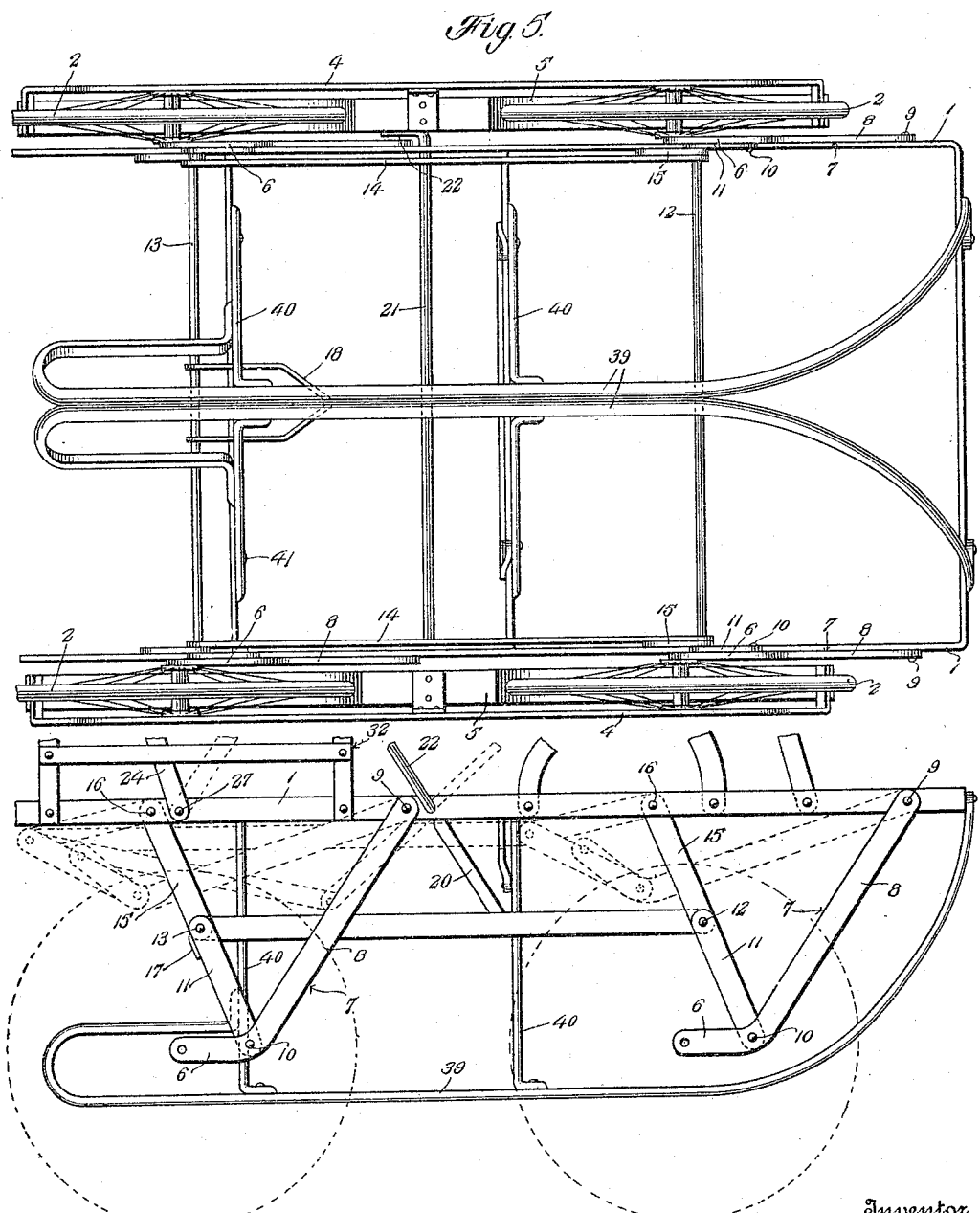

UNITED STATES PATENT OFFICE.

HUBERT BECKERS, OF KALISPELL, MONTANA.

BABY-CARRIAGE AND LIKE VEHICLE.

1,149,111.  Specification of Letters Patent.  Patented Aug. 3, 1915.

Application filed July 3, 1914. Serial No. 848,924.

*To all whom it may concern:*

Be it known that I, HUBERT BECKERS, a citizen of the United States, residing at Kalispell, in the county of Flathead and State of Montana, have invented new and useful Improvements in Baby-Carriages and like Vehicles, of which the following is a specification.

This invention relates to improvements in baby carriages and like vehicles, and particularly to improvements in the construction of the running gear thereof.

The primary object of the invention is to provide a vehicle of the character described having supporting wheels and sled runners, together with means for relatively projecting and retracting the wheels or runners at will, to convert the carriage from a wheeled vehicle into a sled, and vice versa whenever desired.

A further object of the invention is to provide a novel construction of supporting and adjusting device for carrying and projecting and retracting the wheels and runners, which supporting and adjusting devices are adapted to be readily and conveniently operated, and by means of which the runners may be projected to serve as brakes when the wheels are in use to arrest the motion of the vehicle.

A still further object of the invention is to provide runners which may be folded back to an inoperative position so as to be incapable of being projected and retracted, and so as to adapt the vehicle to be folded in close compass for storage and transportation.

With these and other objects in view, the invention consists of the features of construction, combination and arrangement of parts herein fully described and claimed, reference being had to the accompanying drawings in which:—

Figure 1:
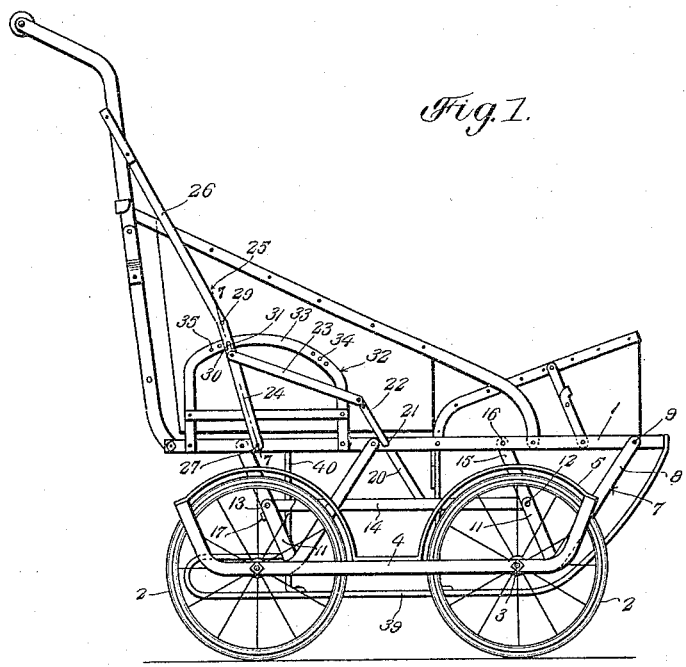
Figure 2:
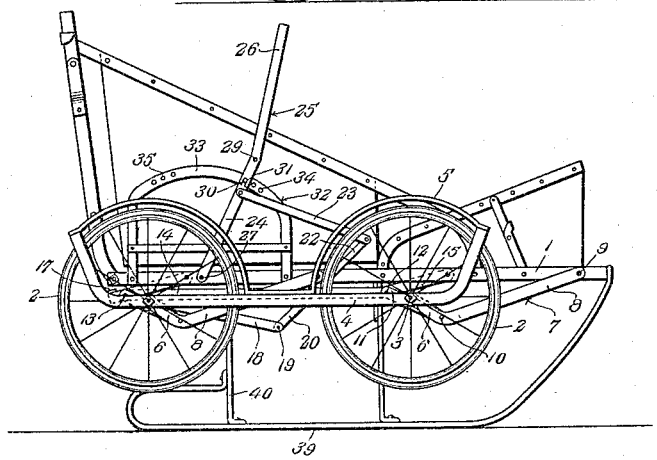
Figure 3:
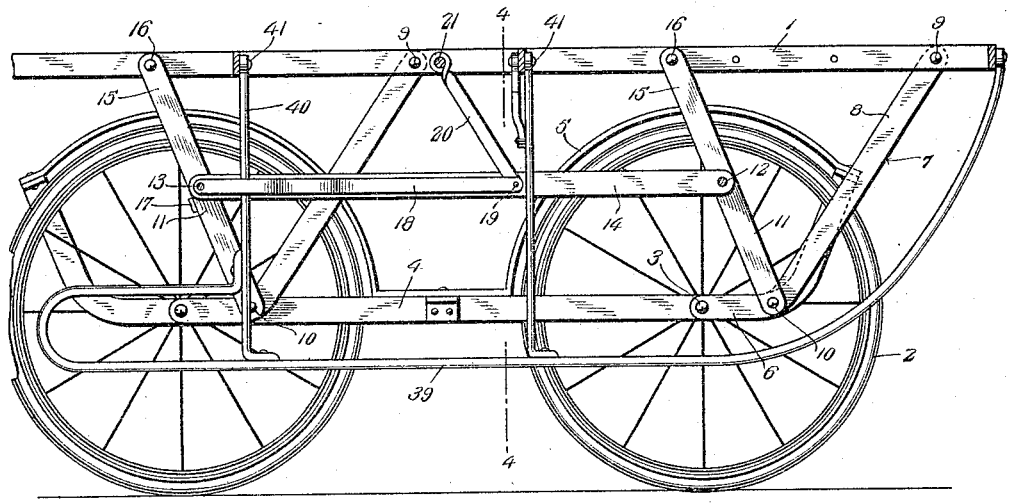
Figures 4, 7:
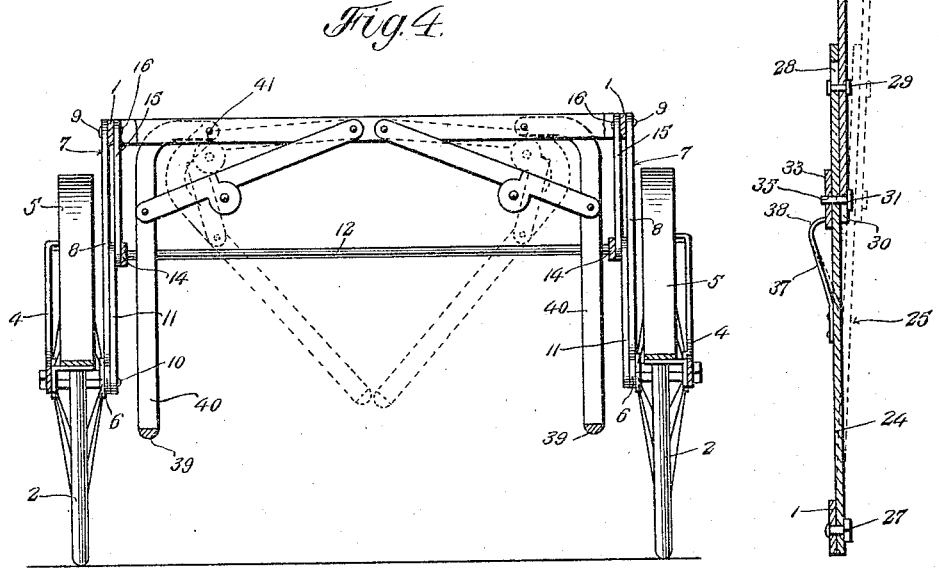

Figure 1 is a side elevation of a baby carriage embodying my invention, showing the runners retracted but in position, for projection when desired, and the wheels projected for use. Fig. 2 is a similar view showing the runners projected and the wheels retracted. Fig. 3 is a vertical longitudinal section through the vehicle with the parts disposed as in Fig. 1. Fig. 4 is a vertical transverse section on the line 4—4 of Fig. 3. Fig. 5 is a bottom plan view showing the runners folded. Fig. 6 is a view of the carrying and adjusting devices at one side of the machine, with the wheels removed to clearly disclose the construction, and showing in full and dotted lines the positions of the parts when disposed as illustrated in Figs. 1 and 2. Fig. 7 is a detail section on the line 7—7 of Fig. 1, illustrating in dotted lines the mode of releasing the lever latch.

Referring to the drawings, 1 designates the rectangular main frame of the vehicle, which may be of any ordinary or preferred construction, and 2 designates the supporting wheels, the wheels at each side of the vehicle being journaled on axles 3 which are fixed at their outer ends to a longitudinally extending carrier bar 4 supporting the fenders 5, the inner ends of the said axles being pivotally coupled to the lower and shorter normally horizontal arms 6 of bell crank main suspending links 7, the longer and approximately vertically disposed arms 8 of which are pivotally connected at their upper ends to the adjacent side of the main frame 1, as indicated at 9. The said links 7 are thus adapted to swing in a vertical plane to raise and lower the frame 1 with relation to the wheels 2. The links 7 are pivotally connected at the angle of intersection of their respective arms, as shown at 10, to the lower end of vertically swinging thrust links 11, which links are pivotally connected at their upper ends to the adjacent end portions of front and rear transverse shafts 12 and 13, said shafts being coupled for movement in unison by longitudinally extending connecting links 14 thereby forming a substantially rectangular supplemental frame which is adjustable with relation to the main frame, said auxiliary frame being connected with and suspended from the main frame by auxiliary suspending links 15, pivotally coupled at their upper ends to the side bars of the main frame, as indicated at 16, and pivotally connected at their lower ends to the respective shafts 12 and 13. The rear auxiliary suspending links 15 are provided with stop members 17 projecting laterally therefrom to engage the thrust links 11 when the link mechanism is adjusted to project the wheels to the fullest extent so that said link mechanism will be prevented from moving beyond a predetermined position in such operation and will be rigidly braced and stayed to form a firm and stable support for the wheels.

One of the shafts, as the rear shaft 13, of the auxiliary frame, is provided with a crank arm 18 which is pivotally connected by a bolt 19 with a crank arm 20 on a transverse rock shaft 21 journaled upon the side bars of the main frame, whereby when said crank shaft is oscillated in a forward or rearward direction opposite adjusting motions will be transmitted to the auxiliary frame to adjust the thrust links to raise or lower the auxiliary frame with relation to the main frame. One end of this crank shaft is provided with a crank arm 22 connected by a coupling link 23 with the main section 24 of an operating lever 25, having also a handle section 26. The main section 24 of said lever is pivotally connected at its lower end, as indicated at 27, to the adjacent side bar of the frame 1, and is provided at its upper end with a longitudinally extending slot 28 receiving the shank of a headed pin or stud 29 carried by the handle section 26 adjacent its lower end, whereby said section 26 is slidably and pivotally connected with the section 24.

The lower end of the lever section 26 is bifurcated or forked, as indicated at 30, to engage the shank of a second headed pin or stud 31 on the lever section 24 below said slot 28, with which stud 31 the forked end of said lever section 26 is adapted to be engaged or disengaged by reverse sliding movements of said lever section. The two lever sections may thus be coupled rigidly together for adjustment to transmit motion to the rock shaft, the lever 26 may be released from rigid connection with the lever section 24 and folded or swung to an inoperative position on the pin or stud 29, so that it may be disposed in compact relation to the other parts of the carriage when said carriage is folded or collapsed into compact shape for storage or transportation.

The lever section 24 is movable longitudinally within a guide bracket 32 fixed to the adjacent side of the main frame, and this guide bracket includes a longitudinally curved locking bar 33 having front and rear series of locking openings 34 and 35 adapted to be engaged by the inwardly extending end of the shank of the pin or stud 31, which is thus adapted to serve the additional function of a locking pin to rigidly secure the lever section 24 in an adjusted position to the main frame. The said lever section 34 carries a retaining spring 37, secured at its lower end thereto, the upper or free end of said spring being provided with an angularly bent portion or head 38 to bear upon the inner side of the locking bar 33, so as to draw said lever member toward said bar and normally hold the locking pin in locking engagement with one or the other of the openings 34 or 35. By pulling outward laterally on the lever, the resiliency of the lever section 24 permits it to be moved outward from the bar against the resistance of the spring to a sufficient degree to release the locking pin, whereupon the lever may be swung longitudinally of the main frame to effect desired adjustments of the link mechanism.

Arranged at the side of the vehicle adjacent to the respective sets of wheels at the opposite sides thereof are runners 39, which have suspension arms 40 pivotally engaging cross pieces of the main frame, as indicated at 41, and said arms are also pivoted to the main frame by sets of toggle joint bracing links, whereby the runners are, when disposed in a vertical position, stayed and locked against outward lateral movement beyond a predetermined position and against inward lateral movement except when positively operated for a folding action. The runners are adapted to normally depend vertically when they are designed for use in conjunction or alternation with the wheels, but are also adapted to be swung to an inwardly and upwardly, substantially horizontal folded position, as illustrated in Fig. 5, which position they may be arranged to occupy when the vehicle is collapsed or at periods when it is not desired to employ the runners for considerable periods, as during those seasons when there is no snow or ice upon the ground. In practice, however, it is designed to dispose the runners in a vertical position, so that if not employed as direct supports for the vehicle, they may be projected, when the vehicle is supported by the wheels, as contact with the surface of the ground to serve as brakes when desired.

Fig. 1 shows the lever adjusted rearwardly for locking engagement with one of the openings 35 to extend the links downwardly, thereby projecting the wheels for use below the runners, allowing the carriage to be employed in the usual way as a wheeled vehicle. When the parts are so adjusted the thrust links are fully extended and the stop members 17 engage and brace the same, whereby the wheel carrier bars and axles are rigidly supported to sustain the wheels for operation. When the lever is thrown forwardly to bring the locking pin into engagement with one of the openings 34 the links will be retracted or drawn upwardly, and thereby raising the wheels above the plane of the acting surfaces of the runners, which will thereby be projected for use to operate the vehicle into a sled for travel over ice or snow, as shown in Fig. 2. When the lever is in the position shown in Fig. 1, it will be evident that it may at any time be moved forwardly to raise the wheels and lower the runners into contact with the ground, so as to adapt the runners to retard the motion of the vehicle or to hold it against possibility of running motion while in standing position. In collapsing the vehicle for convenience in storage or transportation, the wheels may be adjusted to the position shown in Fig. 2 and the runners folded inwardly and upwardly, as shown in Fig. 5, thus disposing the parts of the running gear in compact shape, as will be readily understood.

By constructing the lever in two sections, as shown and described, the handle section is adapted to be disposed longitudinally at the adjacent side of the vehicle when the latter is collapsed, the convenience of which will be manifest.

I claim:—

1. A vehicle of the character described including a main frame, a crank shaft journaled thereon, a swinging frame mounted on the main frame, suspension links mounted on the main frame, wheel supports carried by said suspension links, thrust links connecting said suspension links with the swinging frame, runners mounted upon the main frame, and means for actuating the crank shaft to swing said swinging frame and effect adjustments of the suspension links through said thrust links to adjust the wheels above or below the working plane of the runners.

2. A vehicle of the character described including a main frame, wheel supporting frames, a swinging frame mounted upon the main frame, elbow shaped main suspension links pivoted to the main frame and carrying the wheel supporting frames, thrust links connecting the swinging frame with the elbow shaped suspension links, runners mounted upon the main frame, a rock shaft, and means for transmitting motion through said rock shaft to the swinging frame to adjust the wheels through the medium of the links above or below the working plane of the runners.

3. A vehicle of the character described including a main frame, runners upon the main frame, supporting wheels, a system of links carrying said wheels, a rock shaft connected with the links whereby said links may be adjusted to raise and lower the wheels, a stationary locking member having front and rear keeper openings, a lever section pivoted to the main frame and connected with the crank shaft, a locking pin carried by said lever section for engagement with said openings, a spring for holding said lever section in normal position and the pin in locking position, and a second lever section pivotally and slidably connected with the first-named lever section and having a slotted end for engagement with the latch pin, whereby the lever sections are adapted to be coupled and whereby the first-named lever section may be moved laterally against the resistance of the spring to retract said locking pin.

4. A vehicle of the character described including a main frame, a swinging frame mounted on the main frame, suspension links mounted on the main frame, wheel supports carried by said suspension links, and thrust links connecting said suspension links with the swinging frame, and runners mounted upon the main frame and means for swinging said swinging frame and effecting adjustments of the suspension links through said thrust links to adjust the links above or below the working plane of the runner.

In testimony whereof I affix my signature in presence of two witnesses.

HUBERT BECKERS.

Witnesses:
H. A. KENDALL,
JAMES COOK.